L. VOLLMER.
OVEN.
APPLICATION FILED MAR. 29, 1915.
1,168,769.
Patented Jan. 18, 1916.
2 SHEETS—SHEET 1.
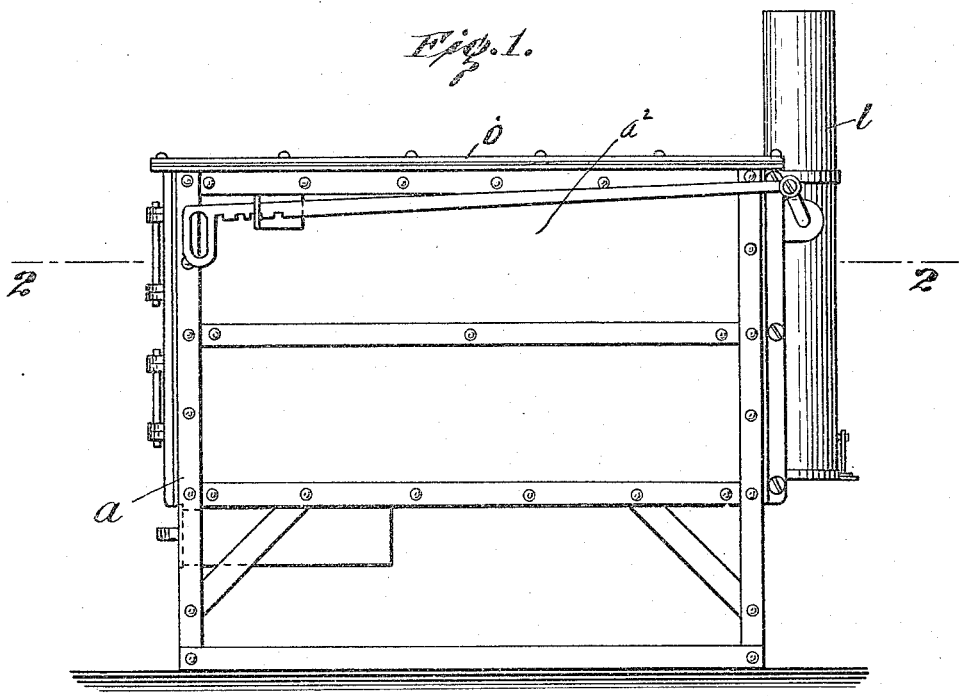
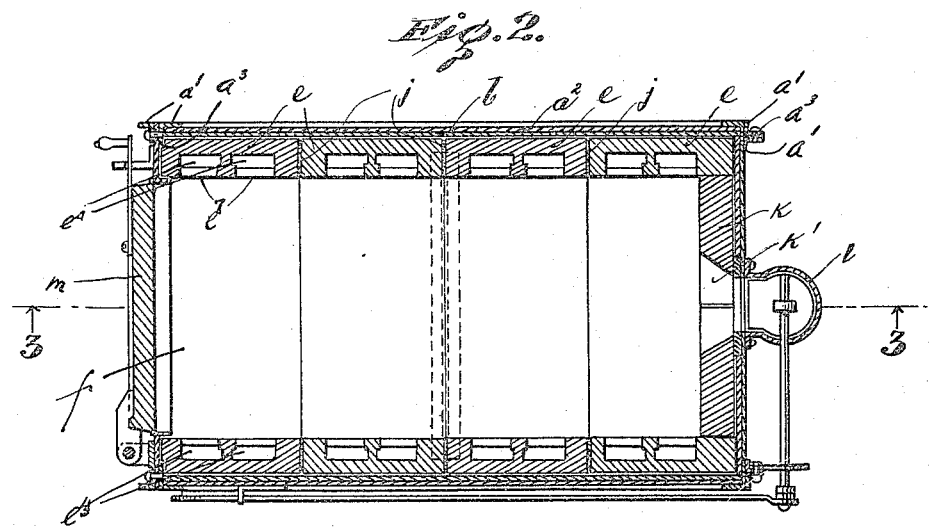

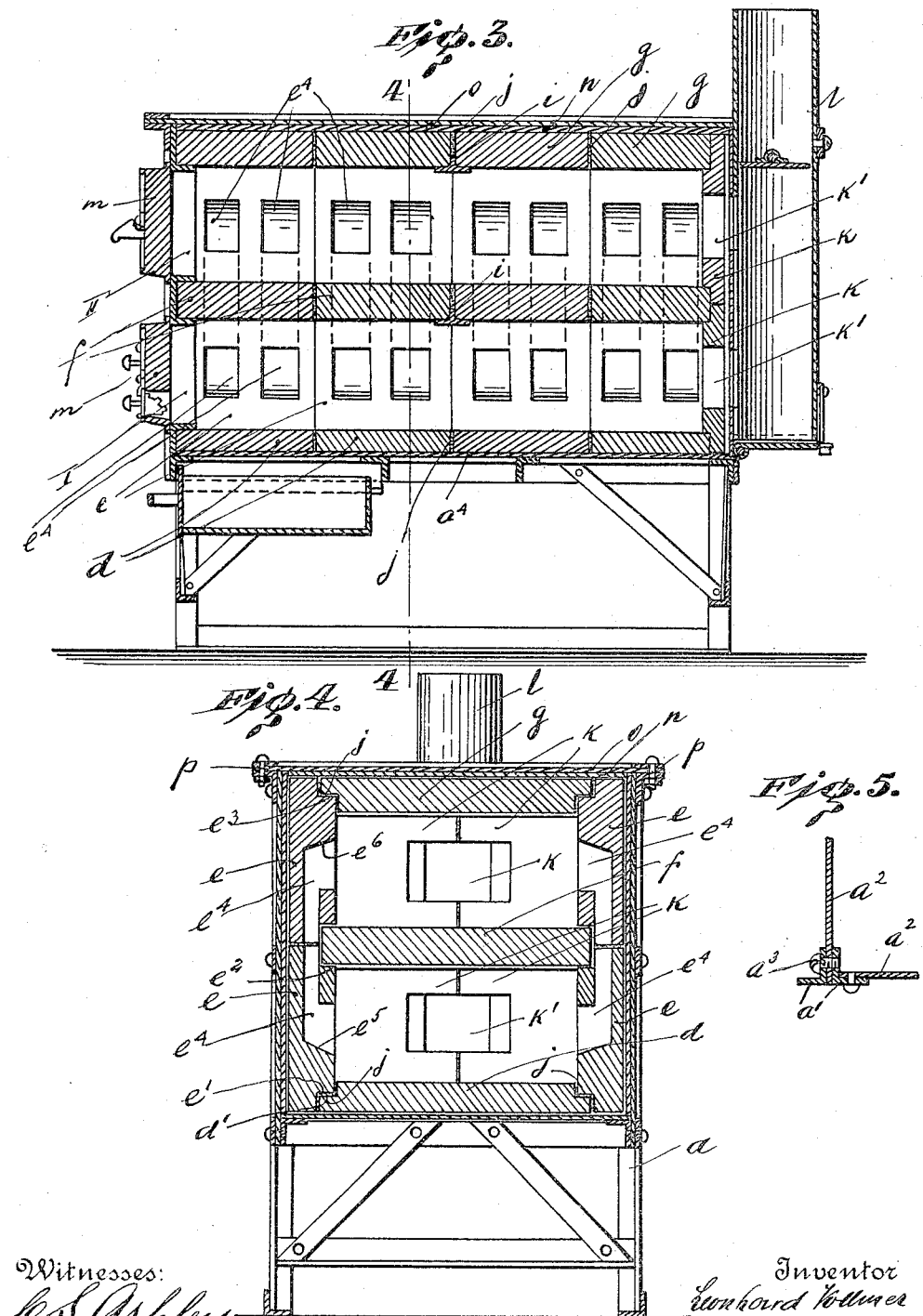

UNITED STATES PATENT OFFICE.

LEONHARD VOLLMER, OF NEW YORK, N. Y.

OVEN.

1,168,769.  Specification of Letters Patent.  Patented Jan. 18, 1916.

Application filed March 29, 1915. Serial No. 17,627.

*To all whom it may concern:*

Be it known that I, LEONHARD VOLLMER, a subject of the German Emperor, residing at New York, in the county of New York and State of New York, have invented certain new and useful Improvements in Ovens, of which the following is a specification.

This invention relates to improvements in portable ovens and has for its object to provide a structure so constructed that it can be quickly and conveniently assembled or knocked down to be suitable for transportation and repairing.

Another object of my invention is to provide an oven with two or more superposed baking compartments, which are in communication with one another through flues or passages provided in the side walls, such that only the lowermost compartments need be directly heated by fire, while the other compartment or compartments receive the heat from said lowermost chamber, which is uniformly distributed throughout the different compartments through said flues.

With these objects in view, my new oven consists in the combination and arrangement of parts, as will be hereinafter specified.

In the accompanying drawings, in which similar reference characters denote corresponding parts, Figure 1 is a side view of the new oven; Fig. 2 is a section on line 2—2 of Fig. 1; Fig. 3 is a section on line 3—3 of Fig. 2; Fig. 4 is a vertical section on line 4—4 of Fig. 3 and Fig. 5 is a sectional detail.

The oven comprises a metal frame $a$ composed of angle irons $a'$ and metal plates $a^2$ riveted to the different angle irons and being fastened together by screw bolts $a^3$ (Fig. 5), to be capable of being easily and quickly taken apart and the walls of which are on their inside lined with asbestos sheets $b$ or other heat retaining material. The interior of the oven is divided horizontally into two or more separate compartments I, II, of which two are shown in the present example. The baking compartments are formed by individual stones or bricks of fireproof material, which are so arranged that they can be readily assembled and disassembled. The stones or bricks $d$ forming the bottom of the lower compartment rest on the bottom $a^4$ of the metal frame, and are so admeasured that they do not extend throughout the entire width of the interior, but leave at each end sufficient space for the insertion of the stones or bricks $e$ for the side walls. The ends of each of the bottom stones may be undercut, as at $d'$, to form tight joints with the similarly undercut lower ends $e'$ of the bricks or stones $e$ of the side walls.

The height of the stones or bricks $e$ of the side walls is substantially equal to the height of a compartment, and the side walls of each compartment are composed of individual stones, making it possible to assemble and disassemble the walls of each compartment separately. The bottom of the upper compartment or the top of the lower compartment is composed of individual stones or bricks $f$ in form and size substantially identical with those of the stones $d$. These stones $f$ rest with their ends on the undercut upper ends $e^2$ of the bricks or stones $e$. In a similar manner, the top of the upper compartment is formed by individual bricks or stones $g$ resting on the undercut portions $e^3$ of the upper ends of the bricks $e$ of the upper compartments. To provide a suitable reinforcement for the bottoms or tops of the upper compartment T-shaped bars $i$ are provided which are arranged to extend across the compartments resting on the bricks of the side walls thereof.

The crevices between the adjoining surfaces of the bricks of the different walls and bottoms, as at $j$, may be closed by suitable fireproof material, such as cement or the like. The back walls of the compartments are also formed by individual bricks $k$ which have cut out parts $k'$ to form openings or passages through which the compartments may communicate with the flue $l$ formed in the metal frame and serving as or leading into a chimney.

The different compartments are adapted to be constantly in communication with one another. To this end I form the bricks $e$ of the side walls, each with vertical passages $e^4$. The bricks of the upper compartment are arranged to rest on those of the lower compartment so that their passages $e^4$ of which those of the lower compartment are open on top and those of the upper are open at the bottom are in extension of one another. The passages of all the bricks are also open on their inner faces, as at $e^7$, so that there will be a direct communication between the different compartments when the bricks are assembled. To enable the cleaning of the passages in a quick and easy manner, those of the lower bricks from the inner faces taper upwardly and those of the upper bricks taper downwardly, as at $e^5$, $e^6$ respectively. Owing to this construction, the cleaning can be easily effected by a brush.

Doors $m$ suspended from the metal frame lead into the different superposed compartments. The top of the last compartment is closed by a sheet $n$ or sheets of fireproof material, such as asbestos, and a metal lid $o$, which is fastened to the metal casings by screws $p$.

In use, a wood fire is built in the lowermost compartment and after the bottom thereof is sufficiently heated, the burned fuel is removed, and the articles to be baked placed in the different compartments of the oven. The heat will after a while through the side wall passages become equally distributed in the different compartments.

In case it is desired to clean or make repairs in any one of the compartments, the upper covers $n$, $o$ are removed. The stones of the side walls and bottoms can be easily taken out to permit access to the particular place where repairs are desired. If any one of the stones should crack, it can be readily replaced by a new one without requiring the taking apart of the entire oven.

My new oven is especially adapted to be used in camps. The construction may be modified without, however, deviating from the spirit of my invention.

What I claim and desire to secure by Letters Patent is:

1. In a portable oven, the combination with a separable metal casing divided into superposed baking compartments, of individual stones or bricks composing the top, bottom and walls of each compartment, the stones of the side walls each being hollow and having an opening on the inner face communicating with one end of the hollow and an opening in one of the longitudinal edges communicating with the opposite end of the hollow, the stones of one of the compartments being adapted to rest on the stones of the other compartment so that the openings in their longitudinal edges coincide with one another and the hollows in the superposed stones constitute passages through which the heat of one compartment is transmitted to the other.

2. In a portable oven, the combination with a separable metal casing divided into superposed baking compartments, of individual stones or bricks composing the top, bottom and walls of each compartment, the stones of the side walls each being hollow and having a tapered opening on the inner face communicating with one end of the hollow and an opening in one of the longitudinal edges communicating with the opposite end of the hollow, the stones of one of the compartments being adapted to rest on the stones of the other compartment so that the openings in their longitudinal edges coincide with one another and the hollows in the superposed stones constitute passages through which the heat of one compartment is transmitted to the other.

3. In a portable oven, the combination with a separable metal casing divided into superposed baking compartments, of individual stones or bricks composing the top, bottom and walls of each compartment, the stones of the side walls each being hollow, and the hollows in the superposed stones or bricks forming vertical passages through which the heat is transmitted from one compartment into the other, the stones composing the top and bottom of each compartment being shorter in width than the width of the compartment, leaving free spaces between their ends and the sides of the casing for the accommodation of the stones of the side walls.

4. In an oven, the combination with a separable metal casing, divided into superposed baking compartments, of a lining of heat retaining material on the inside of said casing and individual stones composing the top, bottom and walls of each compartment, the stones or bricks of the bottom and top of each compartment being shorter in width than that of the respective compartments, leaving free spaces between their ends and the sides of the casing for the accommodation of the stones of the said side walls, the stones of the side walls being hollow and the hollows in the superposed stones forming passages connecting the different compartments, and a common flue at the rear of the casing, the stones or bricks forming the rear wall of each compartment, having openings communicating with said common flue.

In testimony whereof I affix my signature in presence of two witnesses.

LEONHARD VOLLMER.

Witnesses:
E. D. JUNIOR,
D. KLEIN.